US012282152B2

(12) United States Patent
Wu et al.

(10) Patent No.: US 12,282,152 B2
(45) Date of Patent: Apr. 22, 2025

(54) CAMERA MODULE AND ELECTRONIC APPARATUS

(71) Applicant: Honor Device Co., Ltd., Shenzhen (CN)

(72) Inventors: Bin Wu, Shenzhen (CN); Xianxian Zhang, Shenzhen (CN); Yiming Feng, Shenzhen (CN); Yujia Zhai, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/005,303

(22) PCT Filed: Sep. 1, 2022

(86) PCT No.: PCT/CN2022/116617
§ 371 (c)(1),
(2) Date: Jan. 12, 2023

(87) PCT Pub. No.: WO2023/124181
PCT Pub. Date: Jul. 6, 2023

(65) Prior Publication Data
US 2024/0241365 A1  Jul. 18, 2024

(30) Foreign Application Priority Data

Dec. 31, 2021  (CN) .......................... 202111673537.0
Jan. 24, 2022  (CN) .......................... 202210079882.X

(51) Int. Cl.
*G02B 26/08*  (2006.01)
*G03B 3/10*  (2021.01)
(Continued)

(52) U.S. Cl.
CPC .......... *G02B 26/0825* (2013.01); *H04N 23/54* (2023.01); *G02B 2207/121* (2013.01)

(58) Field of Classification Search
CPC .......... G02B 26/0825; G02B 2207/121; H04N 23/54; H04N 23/55; H04N 23/57; G03B 3/10; G03B 30/00
See application file for complete search history.

(56) References Cited

U.S. PATENT DOCUMENTS 11,347,042 B2   5/2022  Ma et al.
2013/0329054 A1*  12/2013  Hoelter .................. H04N 23/57
                                                    348/164
(Continued)

FOREIGN PATENT DOCUMENTS

CN   103548334 A   1/2014
CN   207557556 U   6/2018
(Continued)

OTHER PUBLICATIONS

G.V.Ashwini et al.;"Mitigating the Effects of ESD using ESD Capacitor and TVS Diode"; International Journal of Innovative Technology and Exploring Engineering; Nov. 1, 2019; 5 pages; Retrieved from the internet, URL:https://www.ijitee.org/wp-content/uploads/papers/v9i1/L26891081219.pdf.

*Primary Examiner* — Marly S Camargo
(74) *Attorney, Agent, or Firm* — Slater Matsil, LLP

(57) ABSTRACT

Embodiments of this application relate to the technical field of camera modules to resolve an issue of miniaturization of camera modules. The embodiments of this application provide a camera module and an electronic apparatus. The camera module includes: a circuit board; an image sensor and a driver circuit that are located on the circuit board; an upper lens barrel and a lower lens barrel that are located on a side of the image sensor away from the circuit board; a connecting circuit located on the lower lens barrel; and an adjustable lens disposed inside between the upper lens barrel and the lower lens barrel. The adjustable lens is electrically connected to the driver circuit through the connecting cir- (Continued)

cuit, so as to deform under driving of the driver circuit to adjust a focal power of the camera module. Such camera module has an advantage of small volume ratio.

20 Claims, 12 Drawing Sheets

(51) Int. Cl.
*G03B 30/00* (2021.01)
*H04N 23/54* (2023.01)
*H04N 23/55* (2023.01)
*H04N 23/57* (2023.01)

(56) References Cited

U.S. PATENT DOCUMENTS

| | | | |
|---|---|---|---|
| 2015/0138420 A1 | 5/2015 | Looi et al. | |
| 2017/0160441 A1* | 6/2017 | Ackley | G02B 9/00 |
| 2018/0239063 A1 | 8/2018 | Ackley et al. | |
| 2018/0328717 A1 | 11/2018 | Fordham et al. | |
| 2018/0329170 A1* | 11/2018 | Huang | G03B 3/10 |
| 2019/0058814 A1 | 2/2019 | Jung et al. | |
| 2019/0179132 A1 | 6/2019 | Kang et al. | |
| 2020/0057357 A1* | 2/2020 | Nakamura | H04N 23/51 |
| 2020/0249466 A1 | 8/2020 | Kartashov et al. | |
| 2021/0021212 A1 | 1/2021 | Henriksen et al. | |
| 2021/0271152 A1 | 9/2021 | Wei et al. | |
| 2023/0080778 A1* | 3/2023 | Owaki | H04N 23/51 |
| 2024/0171862 A1* | 5/2024 | Yang | H04N 23/55 |

FOREIGN PATENT DOCUMENTS

| | | | | |
|---|---|---|---|---|
| CN | 207926732 U | 9/2018 | | |
| CN | 109143552 A | 1/2019 | | |
| CN | 109167909 A | 1/2019 | | |
| CN | 209184671 U | 7/2019 | | |
| CN | 209821478 U | 12/2019 | | |
| CN | 110740234 A | 1/2020 | | |
| CN | 112468688 A | 3/2021 | | |
| CN | 213783457 U | 7/2021 | | |
| CN | 113568127 A | * | 10/2021 | G02B 7/021 |
| JP | 2010238888 A | | 10/2010 | |
| KR | 20180047414 A | * | 10/2018 | G03B 17/12 |
| WO | 2014028540 A1 | | 2/2014 | |
| WO | 2021115118 A1 | | 6/2021 | |

* cited by examiner

| | |
|---|---|
| Length | 1.0±0.05mm |
| Width | 0.5±0.05mm |
| Thickness | 0.5±0.05mm |
| Electrostatic capacity | 0.10µF ±10% |
| External electrode spacing g | 0.3mm min. |
| External electrode size e | 0.15 to 0.35mm |
| Working temperature range | -55°C to 85°C |
| Rated voltage | 100Vdc |
| Dimension code inch (mm) | 0402 (1005M) |
| Change rate of electrostatic capacity | ±15.0% |
| Temperature characteristic (standard) | X5R(EIA) |
| Temperature characteristic range | -55°C to 85°C |

FIG. 12

CAMERA MODULE AND ELECTRONIC APPARATUS

CROSS-REFERENCE TO RELATED APPLICATIONS

This application is a national stage of International Application No. PCT/CN2022/116617, filed on Sep. 1, 2022, which claims priority to Chinese Patent Application No. 202111673537.0 filed on Dec. 31, 2021 and Chinese Patent Application No. 202210079882.X filed on Jan. 24, 2022. All of the aforementioned applications are hereby incorporated by reference in their entireties.

TECHNICAL FIELD

This application relates to the technical field of camera modules, and in particular, to a camera module and an electronic apparatus using such camera module.

BACKGROUND

With the rapid development and popularization of smart mobile terminals, many emerging industries have been derived, for example, live streaming, vlog, short videos, and other fields that require fast and high-quality imaging. These emerging industries have imposed rigid requirements on smart terminal devices, including fast auto focus (auto focus, AF), miniaturized AF module, ultra-small opening in the display, and sharp images in near mode and far mode. At present, common focusing modules prefer voice coil motors, adjustable lenses arranged outside of the lens group, dual-lens modules, and the like because of process capability and cost reasons. However, with their complex structure, large volume, poor mechanical reliability, and high assembly and fitting difficulties, the voice coil motors are not conducive to the miniaturization of modules. In addition, the voice coil motor is at high risk of failures when exposed to strong magnetic interference. The adjustable lens arranged outside of the lens group raises the total camera height, causing poor electrostatic breakdown resistance and high risk on reliability, and cannot be used when the mobile terminal is in front side operating conditions. Due to its unsatisfactory focusing effect, low focusing speed, large volume ratio, and high power consumption, the dual-lens modules are unfavorable for the device to meet requirements such as light weight and low power consumption. In addition, users have higher requirements for the quality and use safety of smart mobile terminals.

SUMMARY

A first aspect of this application provides a camera module, including:
  a circuit board;
  an image sensor and a driver circuit that are located on the circuit board;
  an upper lens barrel and a lower lens barrel that are located on a side of the image sensor away from the circuit board;
  a connecting circuit, located on the lower lens barrel; and
  an adjustable lens, disposed inside between the upper lens barrel and the lower lens barrel, where the adjustable lens is electrically connected to the driver circuit through the connecting circuit, so as to deform under driving of the driver circuit to adjust a focal power of the camera module.

In the camera module, the adjustable lens is disposed inside between the upper lens barrel and the lower lens barrel. Compared with existing structures such as a voice coil motor, an adjustable lens arranged outside of a lens group, and a dual-lens module, the module has a low total height and a smaller volume ratio, which reduces assembly and fitting difficulties and is beneficial to satisfying requirements of miniaturization of the module and light weight of the device. In addition, compared with the structure of the voice coil motor, the use of the camera module can avoid the problem that a voice coil motor is at high risk of failures when exposed to strong magnetic interference. Moreover, the adjustable lens in this embodiment of this application is a power-zoom lens and does not require a mechanical structure for driving in the focusing process. Therefore, the focusing speed is fast while the power consumption is low.

In some embodiments, the connecting circuit is embedded in the barrel wall of the lower lens barrel. The connecting circuit is formed by insert molding. Body forming of the lower lens barrel and assembly of the connecting circuit and the lower lens barrel are completed synchronously, which facilitates production and improves production efficiency. In addition, because the connecting circuit is embedded in the barrel wall of the lower lens barrel, the connecting circuit is protected by the barrel wall of the lower lens barrel, and is not affected by static electricity in the air. Therefore, failures in the driver circuit and adjustable lens can be avoided, thereby improving the reliability and stability of the camera module. In this way, only two energized circuits are needed to be electrically connected to the positive and negative electrodes of the adjustable lens, respectively, with no need to prepare an additional element for preventing electrostatic breakdown.

In some embodiments, the connecting circuit is formed on the external surface of the lower lens barrel by laser direct structuring. The external surface of the lower lens barrel is directly gilded with conductive tracks (for example, gold tracks) by laser engraving.

In some embodiments, the connecting circuit includes a first conductive track and a second conductive track that are spaced and insulated from each other, two opposite ends of the first conductive track are electrically connected to the driver circuit and a positive electrode of the adjustable lens, respectively, and two opposite ends of the second conductive track are electrically connected to the driver circuit and a negative electrode of the adjustable lens, respectively. In this way, the driver circuit can provide electrical energy (for example, applying a linear voltage) to the adjustable lens through the first conductive track and the second conductive track, so that a focal power of the adjustable lens changes.

In some embodiments, projections of the first conductive track and the second conductive track on the circuit board are each a straight line segment, which means that the first conductive track and the second conductive track are distributed in straight lines. In this way, no curved and complicated line slots are required to distribute for the first conductive track and the second conductive track, which ensures that laser direct structuring LDS can be performed simply and efficiently, that a working voltage of the connecting circuit is stable, and that the metal conductive tracks can be quickly and automatically produced, thereby improving overall production efficiency. In addition, because the first conductive track and the second conductive track are distributed in straight lines, compared with arrangement of winding wires, a phenomenon of disorderly wires can be avoided, and thus the wire layout is more reasonable and efficient.

In some embodiments, the camera module further includes an anti-electrostatic assembly to provide electrostatic discharge (Electro-Static Discharge, ESD) protection, so as to prevent external static electricity from damaging components such as the adjustable lens. The anti-electrostatic assembly includes a grounding element, and the grounding element is electrically connected to the adjustable lens.

In some embodiments, the grounding element includes a grounding wire, the grounding wire is formed on the external surface of the lower lens barrel by laser direct structuring, and the grounding wire is electrically connected to the adjustable lens and the driver circuit. The grounding wire may be formed in any one of front, rear, left, and right directions of the lower lens barrel.

In some embodiments, a projection of the grounding wire on the circuit board is a straight line segment. To be specific, the grounding wires are distributed in straight lines so as to quickly and automatically produce metal conductive tracks, improve the overall production efficiency, and avoid the phenomenon of disorderly wires, and thus the wire layout is more reasonable and efficient.

In some embodiments, the grounding element includes a capacitor, one terminal of the capacitor is grounded, and the other terminal is electrically connected to the adjustable lens and the driver circuit. Specifically, one terminal of the capacitor is connected to the circuit board for grounding, and the other terminal is electrically connected to the adjustable lens. The capacitor and the driver circuit are designed to be connected in parallel.

In some embodiments, the anti-electrostatic assembly includes insulation glue, and the insulation glue covers the connecting circuit. The insulation glue may be selected from any one of low-viscosity transparent glue, low-viscosity fluorescent ultraviolet (UV) curing glue, or high-viscosity blue glue, or a combination thereof. The transparent insulation glue is convenient for production line inspection, which improves production efficiency, and has a significant effect of preventing electrostatic breakdown, which can improve the reliability of the camera module.

In some embodiments, the camera module further includes a base formed on the circuit board by molding, the base wraps the driver circuit, the base includes an optical aperture configured for light to travel through to the image sensor, and the lower lens barrel is mounted on the base.

In some embodiments, when the connecting circuit includes a first conductive track and a second conductive track, the base includes a first recess and a second recess, where the first recess and the second recess are both provided with a conductive material inside, the first conductive track has one end in direct contact with the conductive material in the first recess and is electrically connected to the driver circuit through the conductive material in the first recess, and the second conductive track has one end in direct contact with the conductive material in the second recess and is electrically connected to the driver circuit through the conductive material in the second recess. The conductive material is, for example, a conductive silver paste, but is not limited thereto. In this way, the driver circuit provides electrical energy (for example, applying a linear voltage) to the adjustable lens through the conductive materials in the first recess and the second recess, the first conductive track, and the second conductive track, so that a focal power of the adjustable lens changes.

In some embodiments, when the grounding element includes a grounding wire, the base includes a third recess, the third recess is provided with a conductive material inside, and the grounding wire has one end in direct contact with the conductive material in the third recess and is electrically connected to the circuit board through the conductive material in the third recess. The circuit board is provided with, for example, a grounding welding pad, and the grounding wire is electrically connected to this grounding welding pad through the conductive material in the third recess, so as to implement grounding.

In some embodiments, the camera module further includes a filter, and the filter is mounted on a side of the base away from the circuit board and is located between the adjustable lens and the image sensor. Further, the filter is located between the lower lens barrel and the image sensor. The filter is configured to reduce red light or infrared ray entering the image sensor and suppress stray light, so as to improve imaging quality.

In some embodiments, the adjustable lens includes a transparent supporting layer, a transparent deformable layer, and a piezoelectric layer that are stacked in sequence, where the piezoelectric layer is configured to deform the deformable layer after being energized, so as to change a radius of curvature of a curved optical surface of the adjustable lens. Because the adjustable lens is a power-zoom lens and does not require a mechanical structure for driving in the focusing process, the focusing speed is fast and the power consumption is low.

In some embodiments, the camera module further includes a non-adjustable lens (also referred to a conventional lens or a fixed focal length lens), where the non-adjustable lens is disposed inside between the upper lens barrel and the lower lens barrel, and the non-adjustable lens is located on a side of the adjustable lens closer to the circuit board; or the non-adjustable lens is located on a side of the adjustable lens farther away from the circuit board. The non-adjustable lens and the adjustable lens work together to implement convergence or divergence of light. The non-adjustable lens may be provided by one or plurality. When there are a plurality of non-adjustable lenses, the adjustable lens may be a lens closest to the image sensor, a lens farthest away from the image sensor, or located between two non-adjustable lenses.

A second aspect of this application provides an electronic apparatus, including the camera module described in the first aspect. The electronic apparatus is, for example, a mobile phone, a notebook computer, an automobile, a home robot, or the like, so as to implement fast auto-focusing and low-power-consumption focusing. In addition, the camera module is not limited to use on the front side or the rear side of the electronic apparatus.

BRIEF DESCRIPTION OF THE DRAWINGS

FIG. 12 is a table of parameters of the capacitors included in FIG. 10 and FIG. 11 that are in simulation comparison.

REFERENCE SIGNS OF MAIN COMPONENTS

Figure 1:
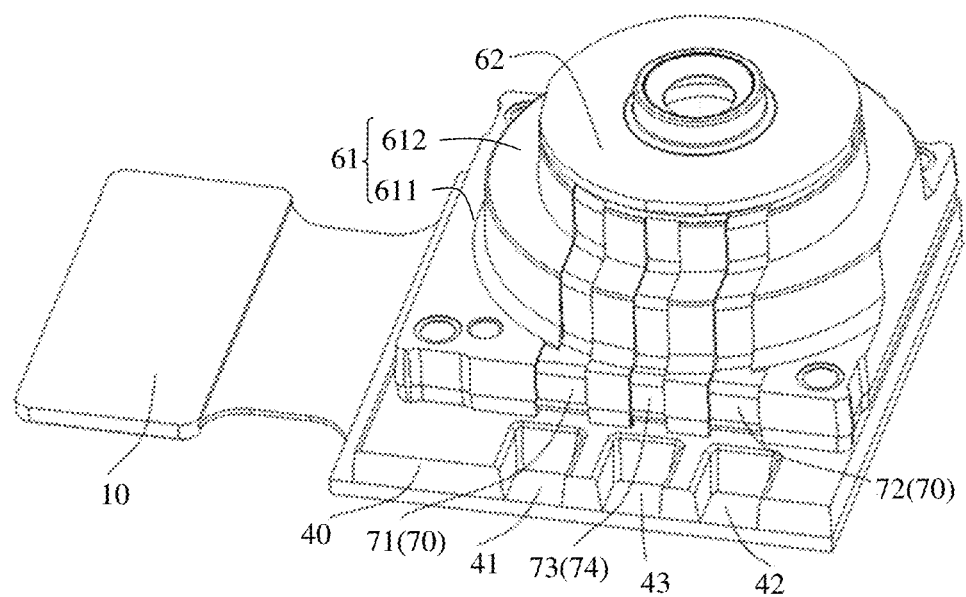
FIG. 1 is a schematic structural diagram of a camera module according to an embodiment of this application.

Camera module 100
Circuit board 10
Driver circuit 20
Image sensor 30
Base 40
First recess 41
Second recess 42
Third recess 43
Body portion 44
Holding portion 45
Optical aperture 46
Filter 50
Lower lens barrel 61
Connecting portion 611
Bearing portion 612
Accommodating recess 6121
Upper lens barrel 62
Connecting circuit 70
First conductive track 71
Second conductive track 72
Third conductive track 73
Grounding wire 74
Adjustable lens 80
Supporting layer 81
Piezoelectric layer 82
Glass plate 83
First energization member 841
Second energization member 842
First conductive member 851
Second conductive member 852
Non-adjustable lens 90
Capacitor C1, C2

DETAILED DESCRIPTION OF ILLUSTRATIVE EMBODIMENTS

To achieve the foregoing objectives, a first aspect of embodiments of this application provides a camera module to resolve a prior-art technical problem of poor capabilities of fast focusing and anti-electrostatic interference caused by external arrangement of an adjustable lens and no electrostatic protection measures or ineffective protection measures taken thereon, to implement pre-positioning of an adjustable lens module to satisfy a requirement of reducing thicknesses of mobile terminal components, to achieve its goal of clarity in both near mode and far mode in live streaming/selfie applications, and to implement miniaturization and low power consumption, thereby building up vlog competitiveness.

A second aspect of the embodiments of this application further provides an electronic apparatus, including the camera module in the first aspect. The electronic apparatus is, for example, a mobile phone. In addition, the camera module may also be applied to a notebook computer, an automobile, a home robot, and the like, to achieve fast auto-focusing and low-power-consumption focusing. In the camera module, the adjustable lens is located between an upper lens barrel and a lower lens barrel, and the overall height of the camera module is relatively low, which is convenient for placing the camera module inside the electronic apparatus. Moreover, the camera module may be used on the front and rear of the electronic apparatus.

The following clearly and completely describes the technical solutions in the embodiments of this application with reference to the accompanying drawings in the embodiments of this application. Apparently, the described embodiments are some rather than all of the embodiments of this application.

FIG. 1 is a schematic structural diagram of a camera module according to an embodiment of this application. As shown in FIG. 1, a camera module 100 includes a circuit board 10, a base 40 located on the circuit board 10, a lower lens barrel 61 located on a side of the base 40 away from the circuit board 10, and an upper lens barrel 62 located on a side of the lower lens barrel 61 away from the circuit board 10.

The lower lens barrel 61 includes a connecting portion 611 and a bearing portion 612 that is configured for carrying a lens (for example, an adjustable lens and/or a non-adjustable lens hereinafter). The connecting portion 611 and the bearing portion 612 connect to each other and may be integrally formed. The connecting portion 611 is roughly rectangular and is fastened to the base 40. The outer contour of the bearing portion 612 is roughly a circular boss. The bearing portion 612 is fastened to the upper lens barrel 62.

A first conductive track 71, a second conductive track 72, and a third conductive track 73 are spaced on the external surface of the lower lens barrel 61, and each of the first conductive track 71, the second conductive track 72, and the third conductive track 73 extends from the external surface of the bearing portion 612 straight to a connection between the connecting portion 611 and the base 40.

The base 40 has a portion extending beyond the lower lens barrel 61. On this portion, the base 40 includes a first recess 41, a second recess 42, and a third recess 43 that correspond to the first conductive track 71, the second conductive track 72, and the third conductive track 73, respectively. The first recess 41, the second recess 42, and the third recess 43 all penetrate two opposite surfaces of the base 40, with a surface of the circuit board 10 exposed.

Figure 2:
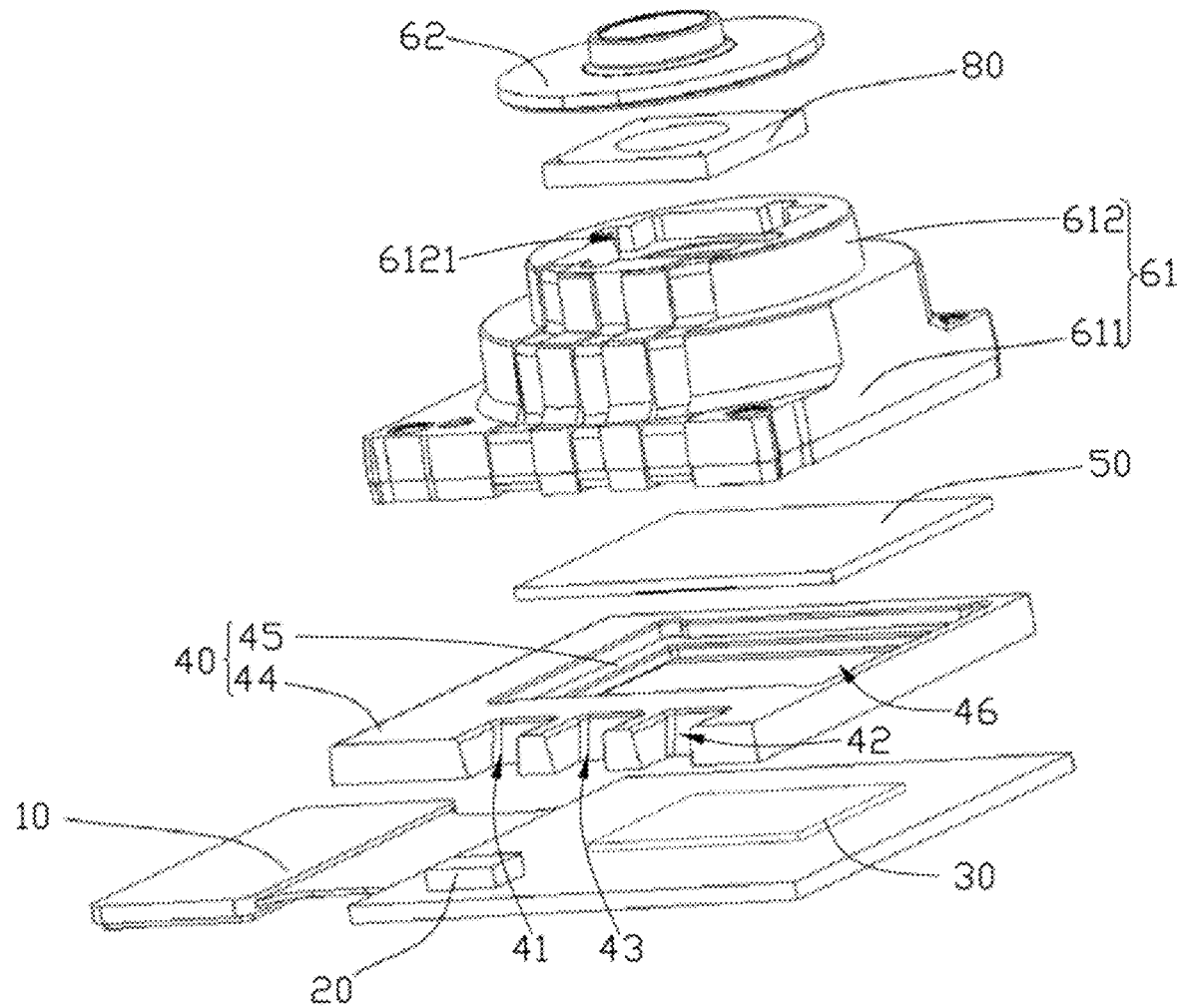
FIG. 2 is an exploded view of the camera module in FIG. 1.

FIG. 2 is an exploded view of the camera module in FIG. 1. As shown in FIG. 2, the camera module 100 includes an image sensor 30 and a driver circuit 20 that are spaced on the circuit board 10, a filter 50 located between the lower lens barrel 61 and the image sensor 30, and an adjustable lens 80 located between the upper lens barrel 62 and the lower lens barrel 61. The bearing portion 612 of the lower lens barrel 61 includes an accommodating recess 6121 recessed toward the connecting portion 611. The accommodating recess 6121 is configured to accommodate the adjustable lens 80.

The circuit board 10 may be a flexible circuit board, a rigid circuit board, or a rigid-flex circuit board. The image sensor 30 is a device that converts an optical signal into an electrical signal, for example, a charge-coupled device (Charge-coupled Device, CCD) or a complementary metal-oxide semiconductor (Complementary Metal-Oxide Semiconductor, CMOS) photosensitive chip. The image sensor 30 is electrically connected to the circuit board 10 through, for example, a wire. In addition, other electronic elements (not shown in the figure) may also be mounted on the circuit board 10. The electronic element is, for example, a resistor, a capacitor, a diode, a transistor, a potentiometer, a relay, or a driver. The driver circuit 20 is, for example, a driver integrated chip (driver integrated chip, driver IC). Further, the circuit board 10 may connect the camera module 100 to the main board of the electronic apparatus, for example, electrically connecting the image sensor 30 and the adjustable lens 80 to the main board of the electronic apparatus, so that the camera module 100 communicates with the main board of the electronic apparatus. For example, the image sensor 30 performs imaging under the control of the main board, and the adjustable lens 80 performs focusing under the control of the main board.

In some embodiments, the base 40 is formed on the circuit board 10 by molding. The base 40 wraps the driver circuit 20, and the base 40 includes an optical aperture 46 configured for light to travel through to the image sensor 30. The lower lens barrel 61 and the upper lens barrel 62 are located on a side of the image sensor 30 away from the circuit board 10. The lower lens barrel 61 is mounted on the base 40.

Specifically, the base 40 includes a body portion 44 that is roughly rectangular annular and a holding portion 45 that extends inward from the body portion 44 (where extending inward may be understood as extending toward the optical center of the camera module 100). The body portion 44 is fastened to the lower lens barrel 61, and an edge of a side the body portion 44 has a portion beyond the lower lens barrel 61. The first recess 41, the second recess 42, and the third recess 43 are formed on the body portion 44 and penetrates two opposite surfaces of the body portion 44. The holding portion 45 is also roughly rectangular annular. The optical aperture 46 is opened at a position of the base 40 corresponding to the image sensor 30 and is roughly rectangular. An L-shaped step is formed at a connection between the body portion 44 and the holding portion 45.

The filter 50 is configured to reduce red light or infrared ray entering the image sensor 30 and suppress stray light, so as to improve imaging quality. The filter 50 is a roughly rectangular shape, and the filter 50 is loaded on L-shaped steps of the base 40. The filter 50 is located between the adjustable lens 80 and the image sensor 30. Further, the filter 50 is located between the lower lens barrel 61 and the image sensor 30. The arrangement of the L-shaped steps facilitates fast assembly of the filter 50 on the base 40. In addition, a side wall of the step can further limit the position of the filter 50 so as to ensure accuracy of the position of the filter 50 with respect to the image sensor 30.

The adjustable lens 80 is configured to deform after being energized so as to adjust the focal length. The adjustable lens 80 is disposed inside between the upper lens barrel 62 and the lower lens barrel 61 and is accommodated in the accommodating recess 6121 of the lower lens barrel 61. The adjustable lens 80 and the lower lens barrel 61 are fastened by gluing or fitting, so as to ensure assemblage and imaging stability of the adjustable lens 80. In the camera module 100, the adjustable lens 80 is located between the upper lens barrel 62 and the lower lens barrel 61, so that the overall height of the camera module 100 can be reduced, thereby reducing volume and facilitating placing the adjustable lens 80 inside the electronic apparatus. In addition, compared with a focusing mode of a voice coil motor, the camera module 100 can also reduce structural complexity and assembly difficulties, and has a compact structure, which is beneficial to implement miniaturization design of the module. Moreover, the problem of the voice coil motor being at high risk when exposed to strong magnetic interference can be avoided. In addition, compared with an adjustable lens being arranged outside of the lens group, there are also advantages of low overall height and compact structure of the camera module. Compared with a dual-lens module, there are also advantages of low overall height and compact structure of the camera module. Furthermore, because the adjustable lens 80 is a power-zoom lens and does not require a mechanical structure for driving in the focusing process, the focusing speed is fast and the power consumption is low.

Figure 3:
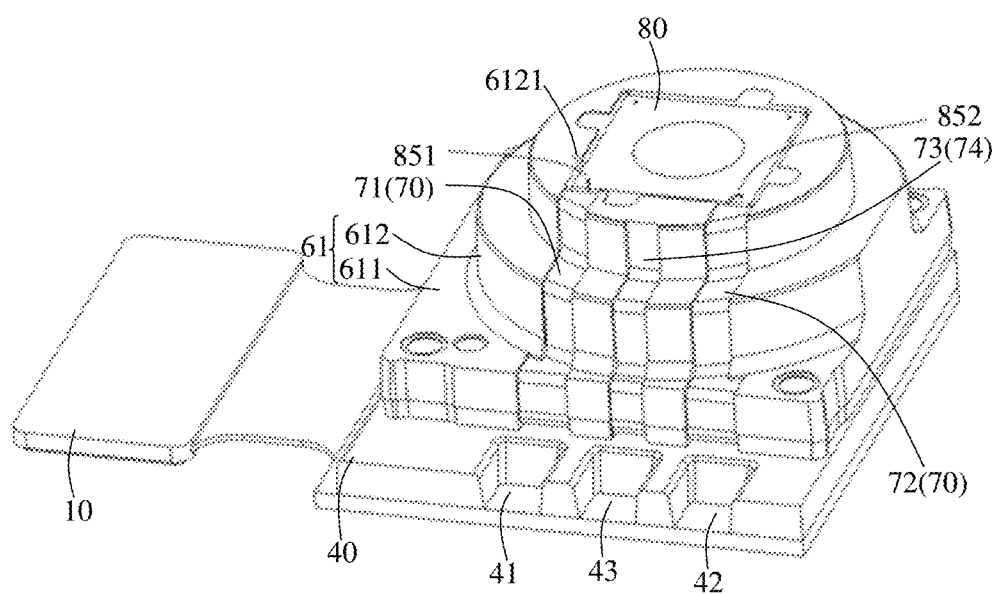
FIG. 3 is a schematic diagram of an adjustable lens in FIG. 2 being electrically connected to a connecting circuit.

As shown in FIG. 3, the lower lens barrel 61 is provided with a connecting circuit 70, and the adjustable lens 80 is electrically connected to the driver circuit 20 through the connecting circuit 70, so as to deform under driving of the driver circuit 20 to adjust a focal power of the camera module 100.

Figure 4:
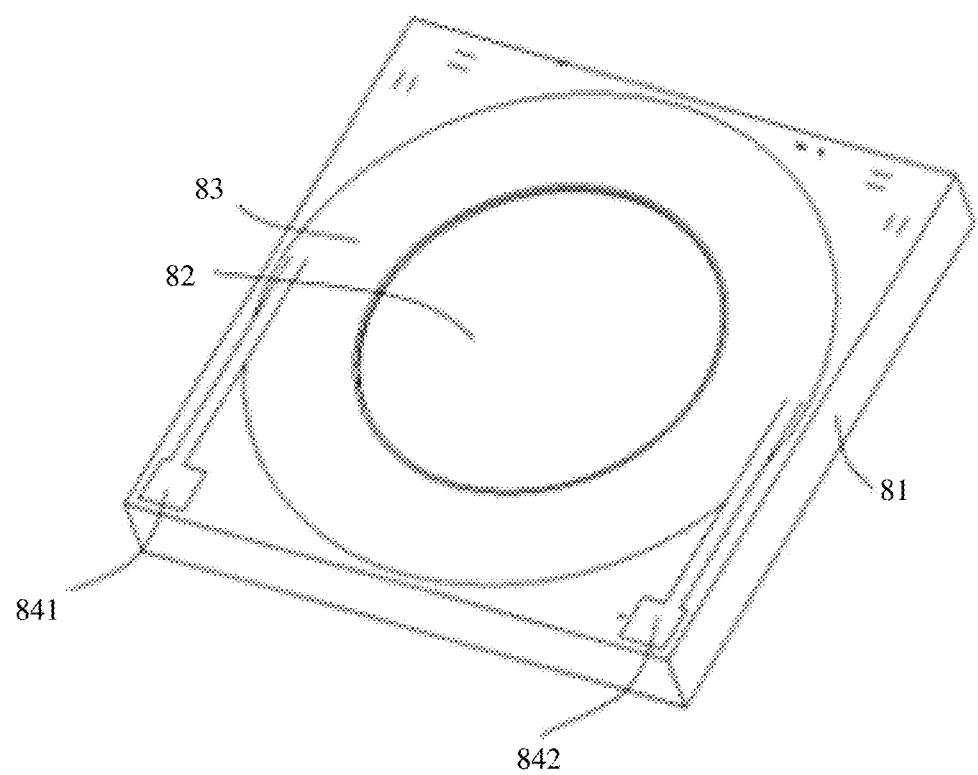
FIG. 4 is a schematic structural diagram of the adjustable lens in FIG. 2.

FIG. 4 is a schematic structural diagram of the adjustable lens in FIG. 2. As shown in FIG. 4, the adjustable lens 80 includes a supporting layer 81, a piezoelectric layer 82, and a glass plate 83 that are stacked in sequence.

The supporting layer 81 is roughly rectangular, is transparent, and is made of, for example, glass, to support film layers (for example, the piezoelectric layer 82 and the glass plate 83) thereon. The piezoelectric layer 82 is roughly circular and can deform after being energized, and is made of, for example, a piezoelectric polymer or piezoelectric ceramic. The glass plate 83 is roughly annular and is located on the piezoelectric layer 82. The piezoelectric layer 82 is partially covered by the glass plate 83 and partially exposes from a hole formed in the inner circle of the glass plate 83.

The adjustable lens 80 includes a first energization member 841 and a second energization member 842 that are spaced at two corners of the adjustable lens 80. The first energization member 841 has one end partially covering the glass plate 83 to be electrically connected to the piezoelectric layer 82 (or, in other words, to be electrically connected to a negative electrode of the adjustable lens 80) through a via hole (not shown in the figure) that penetrates the glass plate 83. The first energization member 841 has another end extending to cover the supporting layer 81 to be electrically connected to the driver circuit 20. Similarly, the second energization member 842 has one end partially covering the glass plate 83 to be electrically connected to the piezoelectric layer 82 (or, in other words, be electrically connected to a positive electrode of the adjustable lens 80) through a via hole (not shown in the figure) that penetrates the glass plate 83. The second energization member 842 has another end extending to cover the supporting layer 81 to be electrically connected to the driver circuit 20.

The adjustable lens 80 further includes a transparent deformable layer (not shown in the figure) located between the supporting layer 81 and the piezoelectric layer 82. The deformable layer is made of a high-molecular polymer, for example, gel. The driver circuit 20 can apply a voltage to the piezoelectric layer 82 through the first energization member 841 and the second energization member 842. After being energized, the piezoelectric layer 82 deforms due to the piezoelectric effect (for example, changing from a flat surface to a spherical surface), which drives the deformable layer to deform, so as to change a radius of curvature of the optical curved surface of the adjustable lens 80.

Refer to FIG. 1 and FIG. 2. After light is transferred to the adjustable lens 80 through the upper lens barrel 62, the adjustable lens 80 changes a convergent path or divergent path of light based on the change of the radius of curvature, so as to adjust a focal power. The light focused by the adjustable lens 80 is then transferred to the image sensor 30 through the filter 50 for imaging.

In FIG. 4, the supporting layer 81 may be a piece of light transmitting glass. After the piezoelectric layer 82 is energized, a surface of the deformable layer close to the supporting layer 81 may not deform due to restriction of the supporting layer 81. Alternatively, the radius of curvature of a surface of the deformable layer attached to the supporting layer 81 does not change, so that a shape variable of the deformable layer is presented on a surface of the deformable layer away from the supporting layer 81. To be specific, stretching of the piezoelectric layer 82 drives the surface of the deformable layer away from the supporting layer 81 to convex or concave, which further causes the light to converge or diverge, making the adjustable lens 80 act as a convex lens or concave lens to implement the function of focusing.

Further, the radius of curvature of the deformed curved optical surface of the adjustable lens 80 is positively correlated with the absolute value of the voltage applied to the adjustable lens 80. In other words, the shape variable of the adjustable lens 80 is proportional to magnitude of the voltage applied to the piezoelectric layer 82. In some embodiments, as the voltage applied to the piezoelectric layer 82 gradually increases from 0, 10 V, 20 V, 30 V, 40 V, 50 V, and so on, the curved optical surface of the adjustable lens 80 is gradually convex upwards from a flat surface to a side away from the supporting layer 81, and the radius of curvature of the curved optical surface of the adjustable lens 80 gradually increases. As the voltage applied to the piezoelectric layer 82 gradually decreases from 0, −10 V, −20 V, −30 V, −40 V, −50 V, and so on, the curved optical surface of the adjustable lens 80 is gradually concave downwards from a flat surface to a side close to the supporting layer 81, and the radius of curvature of the curved optical surface of the adjustable lens 80 gradually increases. As such, the radius of curvature of the deformed curved optical surface of the adjustable lens 80 can be adjusted by adjusting the magnitude and direction of the voltage applied to the adjustable lens 80, so as to adjust the focal power of the camera module 100, implementing objectives of fast auto-zooming and low-power-consumption focusing, and providing sharp images of the camera module with a built-in adjustable lens in near mode and far mode.

Persons of ordinary skill in the art can understand that all or some of the steps in the foregoing method for applying a voltage to the adjustable lens to adjust the focal power can be implemented by a program to instruct relevant hardware, where the program may be stored in a computer-readable storage medium, and when the program is executed, one or a combination of the steps of the method embodiment are included.

Refer to FIG. 1 to FIG. 4. The adjustable lens 80 may be electrically connected to the driver circuit 20 on the circuit board 10 through the first energization member 841, the second energization member 842, and the connecting circuit 70 on the lower lens barrel 61.

In some embodiments, the connecting circuit 70 is directly formed on the external surface of the lower lens barrel 61 by laser direct structuring (Laser-Direct Structuring, LDS). The connecting circuit 70 includes a first conductive track 71 and a second conductive track 72. The first conductive track 71 and the second conductive track 72 may be formed directly through plating a metal conductive track (such as a gold track) on the external surface of the lower lens barrel 61 by laser engraving. Two opposite ends of the first conductive track 71 are configured to be electrically connected to the driver circuit 20 and the adjustable lens 80, respectively, and two opposite ends of the second conductive track 72 are also configured to be electrically connected to the driver circuit 20 and the adjustable lens 80, respectively. The driver circuit 20 provides electrical energy to the adjustable lens 80 through the first conductive track 71 and the second conductive track 72.

The driver circuit 20 includes, for example, a positive electrode welding pad (not shown in the figure) and a negative electrode welding pad (not shown in the figure). The first recess 41 and the second recess 42 on the base 40 are each provided with a conductive material (not shown in the figure) inside. The conductive material is, for example, a conductive silver paste, but is not limited thereto. The conductive material in the first recess 41 is located on the circuit board 10 and is electrically connected to the positive electrode welding pad of the driver circuit 20. The conductive material in the second recess 42 is located on the circuit board 10 and is electrically connected to the negative electrode welding pad of the driver circuit 20.

Refer to FIG. 3 and FIG. 4. The camera module 100 includes a first conductive member 851 and a second conductive member 852. One end of the first conductive member 851 is electrically connected to the negative electrode of the adjustable lens 80 through the first energization member 841, and one end of the second conductive member 852 is electrically connected to the positive electrode of the adjustable lens 80 through the second energization member 842. Another end of the first conductive member 851 is electrically connected to the first conductive track 71, and another end of the second conductive member 852 is electrically connected to the second conductive track 72.

After one end of the first conductive track 71 is connected to the first conductive member 851, the first conductive track 71 extends along the external surface of the lower lens barrel 61 to be in direct contact with the conductive material in the first recess 41 and is electrically connected to the positive electrode welding pad of the driver circuit 20 through the conductive material in the first recess 41. Similarly, after one end of the second conductive track 72 is connected to the second conductive member 852, the second conductive track 72 extends along the external surface of the lower lens barrel 61 to be in direct contact with the conductive material in the second recess 42 and is electrically connected to the negative electrode welding pad of the driver circuit 20 through the conductive material in the second recess 42. In this way, the driver circuit 20 on the circuit board 10 can provide electrical energy (for example, applying a linear voltage) to the adjustable lens 80 through the conductive materials in the first recess 41 and the second recess 42, the first conductive track 71, the second conductive track 72, the first conductive member 851, the second conductive member 852, the first energization member 841, and the second energization member 842, so as to change a focal power of the adjustable lens 80.

In some embodiments, the first conductive member 851 and the second conductive member 852 may be copper wires or conductive cloth, or the like. The copper wires or conductive cloth are easy-to-obtain conductive wires, and have the advantages of easy assembly and low material costs.

In some embodiments, the first conductive tracks 71 and the second conductive tracks 72 are distributed in straight lines, which means that projections of the first conductive track 71 and the second conductive track 72 on the circuit board 10 are each a straight line segment. In this way, no curved and complicated line slots are required to distribute for the first conductive track 71 and the second conductive track 72, which ensures that laser direct structuring LDS can be performed simply and efficiently, that a working voltage of the connecting circuit 70 is stable, and that the metal conductive tracks can be quickly and automatically produced, thereby improving overall production efficiency. In addition, because the first conductive track 71 and the second conductive track 72 are distributed in straight lines, compared with arrangement of winding wires, a phenomenon of disorderly wires can be avoided, and thus the wire layout is more reasonable and efficient.

It should be noted that in existing camera modules, the adjustable lens is arranged outside of the lens barrel with no electrostatic protection measures taken or with ineffective protection measures taken, resulting in poor capabilities of fast focusing and preventing electrostatic interference. The following describes design of electrostatic protection for the camera module according to this embodiment of this application when the connecting circuit is formed on the external surface of the lower lens barrel.

To be specific, the camera module 100 includes an anti-electrostatic assembly to provide electrostatic discharge (Electro-Static Discharge, ESD) protection, so as to prevent external static electricity from damaging elements such as the adjustable lens 80.

Figure 5:
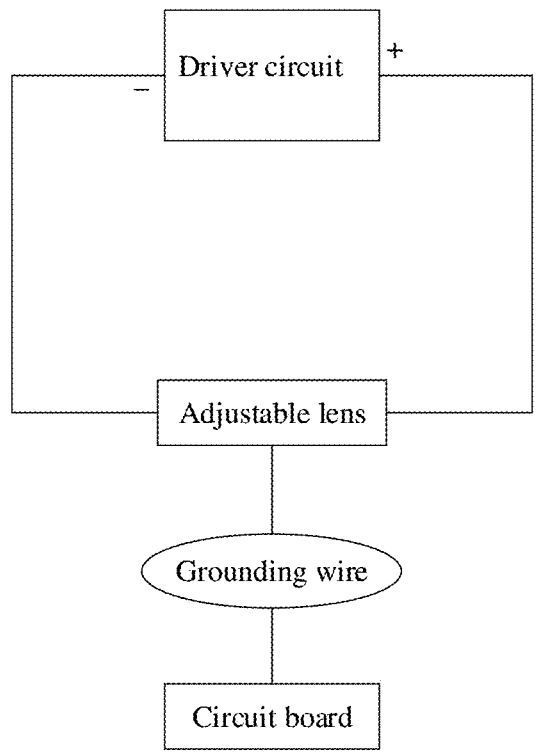
FIG. 5 is a schematic diagram of a circuit with an anti-electrostatic assembly being a grounding wire according to an embodiment of this application.

In some embodiments, the anti-electrostatic assembly includes a grounding element electrically connected to the adjustable lens 80, where the grounding element includes a grounding wire. FIG. 5 is a schematic diagram of a circuit with an anti-electrostatic assembly being a grounding wire according to an embodiment of this application. As shown in FIG. 5, the grounding wire is electrically connected to the adjustable lens and the circuit board, so that the external static electricity is discharged through the grounding wire.

Refer to FIG. 3 again. The third conductive track 73 is located between the first conductive track 71 and the second conductive track 72 and may be formed on the external surface of the lower lens barrel 61 by LDS. The third conductive track 73 is the grounding wire 74. To be specific, the grounding wire 74 may alternatively be formed by plating a metal conductive track (for example, a gold track) directly on the external surface of the lower lens barrel 61 by laser engraving. A conductive material (for example, a conductive silver glue) is provided in the third recess 43 of the base 40 corresponding to the grounding wire 74. After one end of the grounding wire 74 is electrically connected to the adjustable lens 80, the grounding wire 74 extends along the external surface of the lower lens barrel 61 to be in direct contact with the conductive material in the third recess 43 and is electrically connected to the circuit board 10 through the conductive material in the third recess 43. The circuit board 10 is provided with, for example, a grounding welding pad (not shown in the figure), and the grounding wire 74 is electrically connected to the grounding welding pad through the conductive material in the third recess 43 so as to implement grounding.

In some embodiments, the third conductive track 73 (that is, the grounding wire 74) is distributed in straight lines, which means that a projection of the third conductive track 73 on the circuit board 10 is a straight line segment. In this way, the grounding wire is arranged without curved and complicated line slots, which ensures that the laser direct structuring LDS process can be performed simply and efficiently, and that a working voltage of the connecting circuit is stable, thereby producing metal conductive tracks quickly and automatically, so as to improve the overall production efficiency. In addition, because the third conductive track is distributed in straight lines, compared with arrangement of the winding wires, a phenomenon of disorderly wires can be avoided, and therefore the wire layout is more reasonable and efficient.

It should be noted that, in FIG. 3, the first conductive track 71, the second conductive track 72, and the third conductive track 73 that are formed on a same side of the lower lens barrel 61 (which defines in FIG. 3 that they are formed on the front side of the lower lens barrel 61) and the first recess 41, the second recess 42, and the third recess 43 that are formed on a same side of the base 40 (which defines in FIG. 3 that they are formed on the front side of the base 40) are described as an example. In other embodiments, the first conductive track and the second conductive track that are used as conductive lines for the positive and negative electrodes of the adjustable lens and the third conductive track used as the grounding wire may all be formed in any one of front, rear, left, and right directions of the lower lens barrel. For example, the first conductive track and the second conductive track are located in one of the front, rear, left, and right directions of the lower lens barrel, while the third conductive track used as the grounding wire is located in a direction of the front, rear, left, and right directions of the lower lens barrel different from that of the first conductive track and the second conductive track. Correspondingly, the first recess, the second recess, and the third recess are formed on the base in directions corresponding to the first conductive track, the second conductive track, and the third conductive track, respectively. Alternatively, the first conductive track, the second conductive track, and the third conductive track are located in different directions of the front, rear, left, and right directions of the lower lens barrel. Alternatively, the first conductive track, the second conductive track, and the third conductive track are formed in a same direction of the lower lens barrel, any two of the first conductive track, the second conductive track, and the third conductive track are used as conductive lines of the positive and negative electrodes of the adjustable lens, and the remaining one of the third of the first conductive track, the second conductive track, and the third conductive track is used as a conductive line of the grounding wire.

Figure 6:
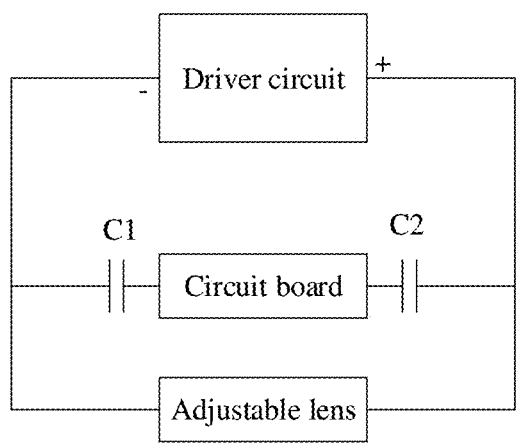
FIG. 6 is a schematic diagram of a circuit with an anti-electrostatic assembly being a capacitor according to an embodiment of this application.

In some embodiments, in the anti-electrostatic assembly, the grounding element electrically connected to the adjustable lens 80 includes a grounding capacitor. FIG. 6 is a schematic diagram of a circuit with the anti-electrostatic assembly being a grounding capacitor according to an embodiment of this application. As shown in FIG. 6, the grounding capacitor C1 has a terminal connected to the circuit board for grounding and another terminal electrically connected to the adjustable lens. Similarly, the grounding capacitor C2 has a terminal connected to the circuit board for grounding and another terminal electrically connected to the adjustable lens. The grounding capacitor C1 and the grounding capacitor C2 each are connected to the driver circuit in parallel. To be specific, the grounding capacitor C1 is electrically connected between the driver circuit and the conductive material in the first recess. The grounding capacitor C2 is electrically connected between the driver circuit and the conductive material in the second recess.

Figure 7:
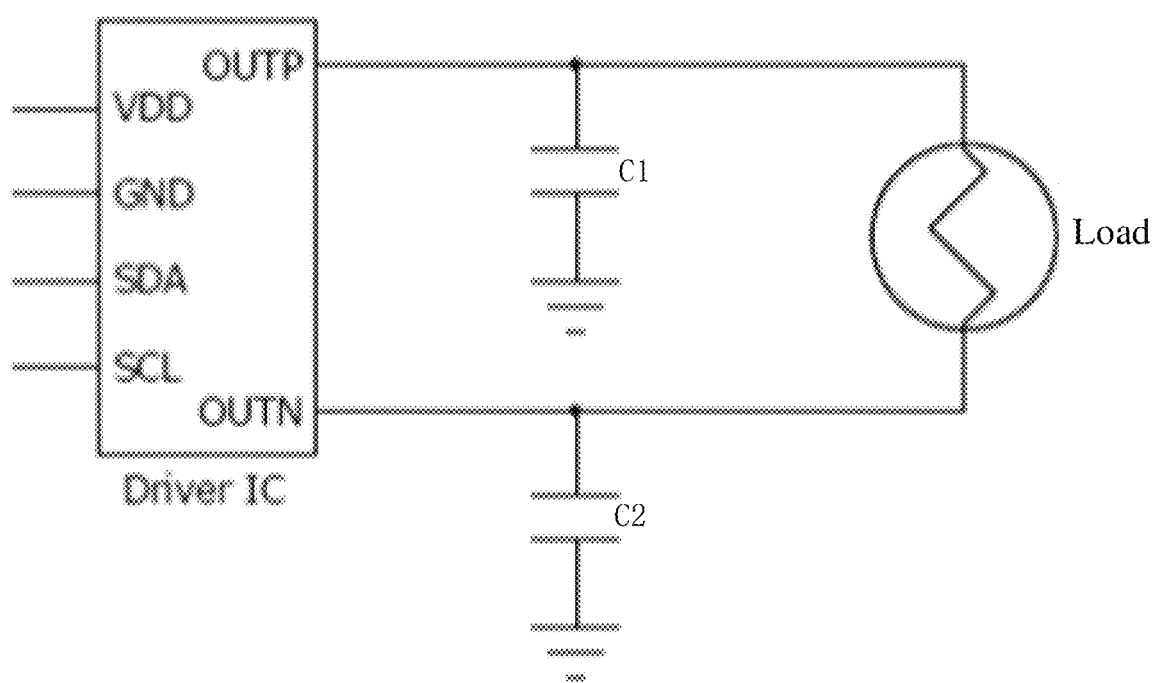
FIG. 7 is a schematic diagram of a circuit with a driver circuit being connected to a grounding capacitor according to an embodiment of this application.

FIG. 7 is a schematic diagram of a circuit with a driver circuit being connected to a grounding capacitor according to an embodiment of this application. In FIG. 7, Driver IC is the driver circuit, and Load is the adjustable lens. In FIG. 7, the circuit board is omitted. The Driver IC includes a plurality of input interfaces and output interfaces. The input interfaces include a voltage drain VDD interface, a grounding GND interface, a serial data line (Serial Data Line, SDA) interface, and a serial clock line (Derail Clock Line, SCL) interface of a device, but are not limited thereto. The output interfaces include OUTP and OUTN, but are not limited thereto.

Figure 8:
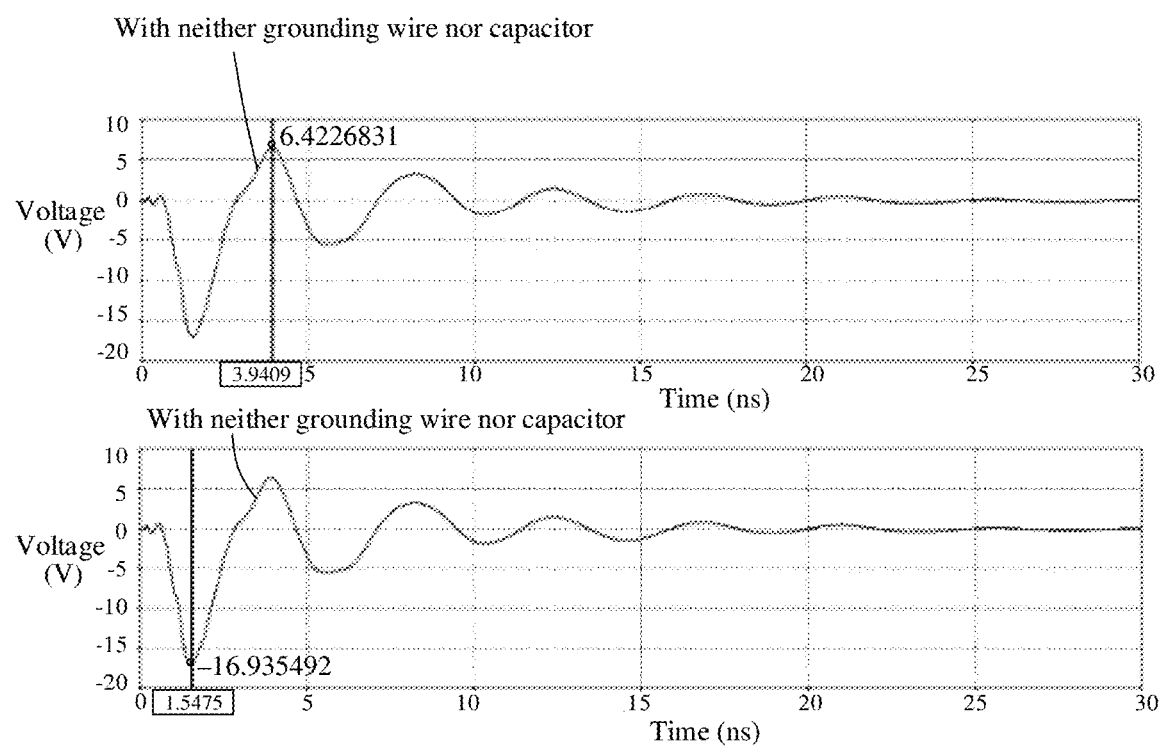
FIG. 8 is a simulation diagram of curves of contact discharge electric field distribution of a camera module with no grounding wire and no capacitor.

FIG. 8 is a simulation diagram of curves of contact discharge electric field distribution of a camera module with no grounding wire and no capacitor. Through contact discharge, the peak-to-peak value of the static electricity (in FIG. 8, the peak-to-peak value of the static electricity is the maximum value of differences between a peak of 6.4226831 V and a valley of −16.935492 V) of the camera module is approximately 23.3 V. At this point, the camera module has a risk electrostatic breakdown.

Figure 9:
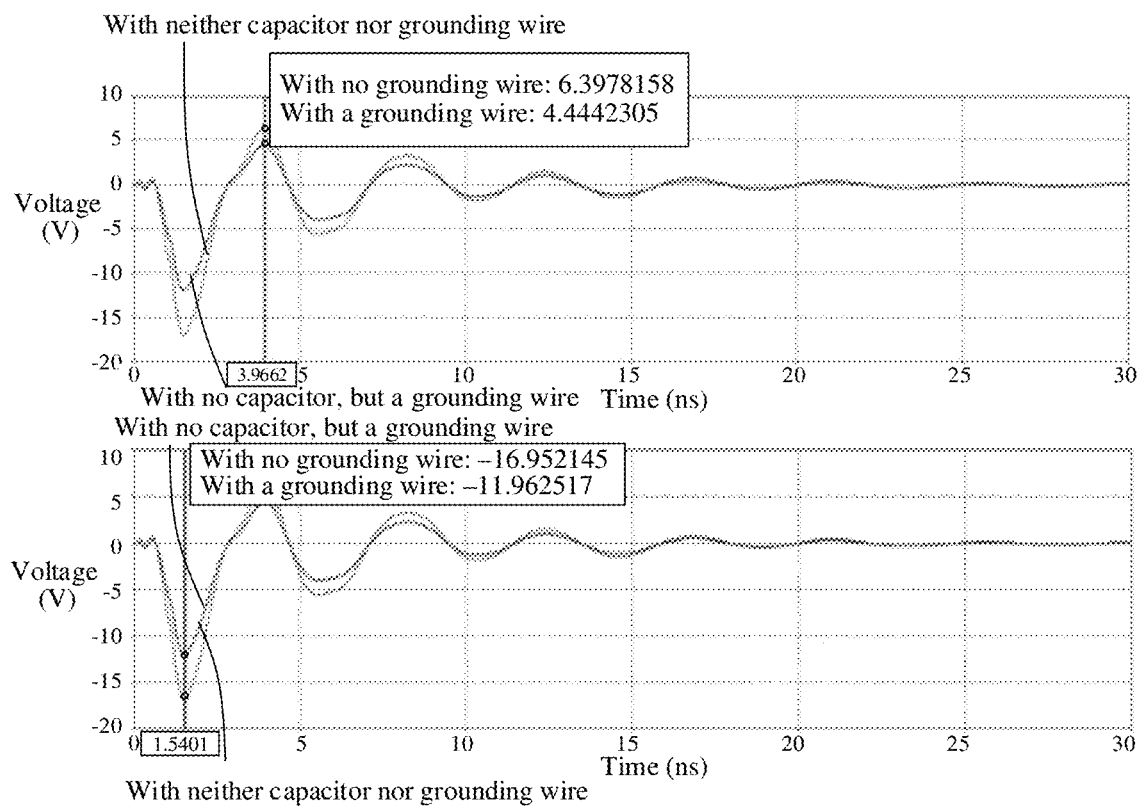
FIG. 9 is a simulation comparison diagram of curves of contact discharge electric field distribution of a camera module when an anti-electrostatic assembly includes a grounding wire and includes no grounding wire under a premise that no capacitor is included.

FIG. 9 is a simulation comparison diagram of curves of contact discharge electric field distribution of a camera module when an anti-electrostatic assembly includes a grounding wire and includes no grounding wire under a premise that no capacitor is included. As shown in FIG. 9, after a grounding wire is added, part of the energy obviously flows away from the grounding wire. It is seen from simulation results that after the grounding wire is added, the peak-to-peak value of the static electricity (in FIG. 9, the peak-to-peak value of the static electricity is the maximum value of differences between a peak of 4.4442305 V and a valley of −11.962517 V) is approximately 16.3 V, which is 30% lower than 23.3 V, a value before the grounding wire is added.

Figure 10:
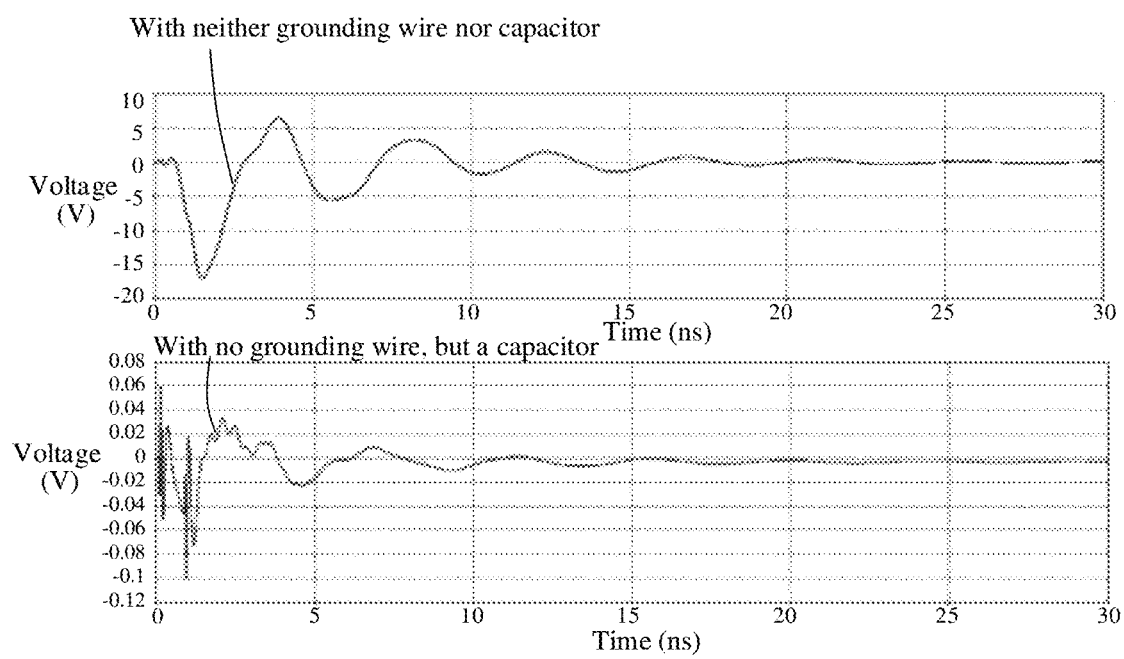
FIG. 10 is a simulation comparison diagram of curves of contact discharge electric field distribution of a camera module when an anti-electrostatic assembly includes a capacitor and includes no capacitor under a premise that no grounding wire is included.
Figure 11:
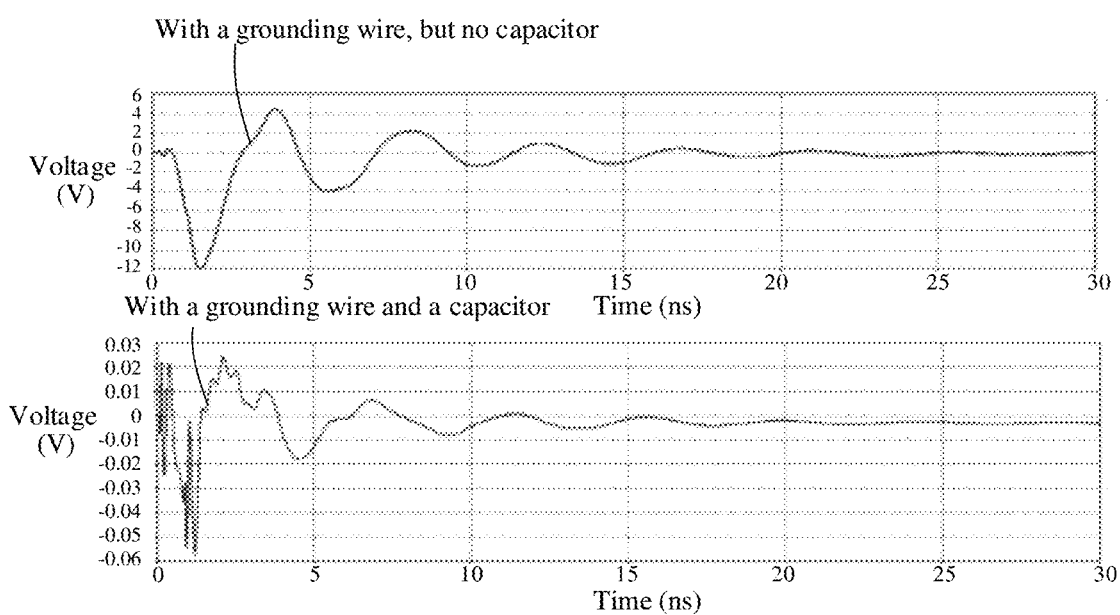
FIG. 11 is a simulation comparison diagram of curves of contact discharge electric field distribution of a camera module when an anti-electrostatic assembly includes a capacitor and includes no capacitor under a premise that a grounding wire is included.

FIG. 10 is a simulation comparison diagram of curves of contact discharge electric field distribution of a camera module when an anti-electrostatic assembly includes a capacitor and includes no capacitor under a premise that no grounding wire is included. FIG. 11 is a simulation comparison diagram of curves of contact discharge electric field distribution of a camera module when an anti-electrostatic assembly includes a capacitor and includes no capacitor under a premise that a grounding wire is included. FIG. 12 is a table of parameters of the capacitors included in FIG. 10 and FIG. 11 that are in simulation comparison. As shown in FIG. 12, a capacitance of the capacitor is 0.10 μF, that is, 100 nF. In other embodiments, a specific parameter of the grounding capacitor is not limited to those shown in FIG. 12. As shown in FIG. 10, when no grounding wire is added, only a capacitor of 100 nF is added, and it is seen that magnitude of the static electricity is significantly reduced. Similarly, as shown in FIG. 11, when a grounding wire is added, a capacitor of 100 nF is added, it is seen that magnitude of the static electricity is also significantly reduced. It can be learned that after a capacitor is added, the static electricity is greatly reduced whether the grounding wire is added or not.

In some embodiments, the anti-electrostatic assembly includes insulation glue (not shown in the figure) covering the connecting circuit. The insulation glue covers surfaces of the first conductive track, the second conductive track, and the third conductive track, so as to prevent electrostatic breakdown. Specifically, the insulation glue may be selected from any one of low-viscosity transparent glue, low-viscosity fluorescent ultraviolet (UV) curing glue, or high-viscosity blue glue, or a combination thereof. The insulation glue prevents static electricity from entering the conductive tracks (for example, the first conductive track, the second conductive track, and the third conductive track), thereby avoiding electrostatic breakdown failures of the driver circuit and the adjustable lens. The transparent insulation glue is convenient for production line inspection, which improves production efficiency, and has a significant effect of preventing electrostatic breakdown, which can improve the reliability of the camera module.

In some embodiments, the anti-electrostatic assembly may include any one of a grounding wire, a grounding capacitor, and insulation glue; or, a combination of any two of the grounding wire, the grounding capacitor, and the insulation glue; or all three of the grounding wire, the grounding capacitor, and the insulation glue. In other words, the anti-electrostatic assembly may be designed by disposing a conductive track in any one of the front, rear, left, and right directions of the external surface of the side wall of the lower lens barrel to connect to the circuit board for linear grounding. Alternatively, the anti-electrostatic assembly may be designed by grounding a capacitor connected to the positive and negative electrodes of the driver circuit, so as to prevent electrostatic breakdown of the driver circuit and the adjustable lens. Alternatively, the anti-electrostatic assembly may be designed by applying insulation glue on the connecting circuit to prevent static electricity from entering the connecting circuit, so as to prevent electrostatic breakdown of the driver circuit and the adjustable lens. This facilitates operability of actual mass production and improves reliability of small-head camera modules.

Figure 13:
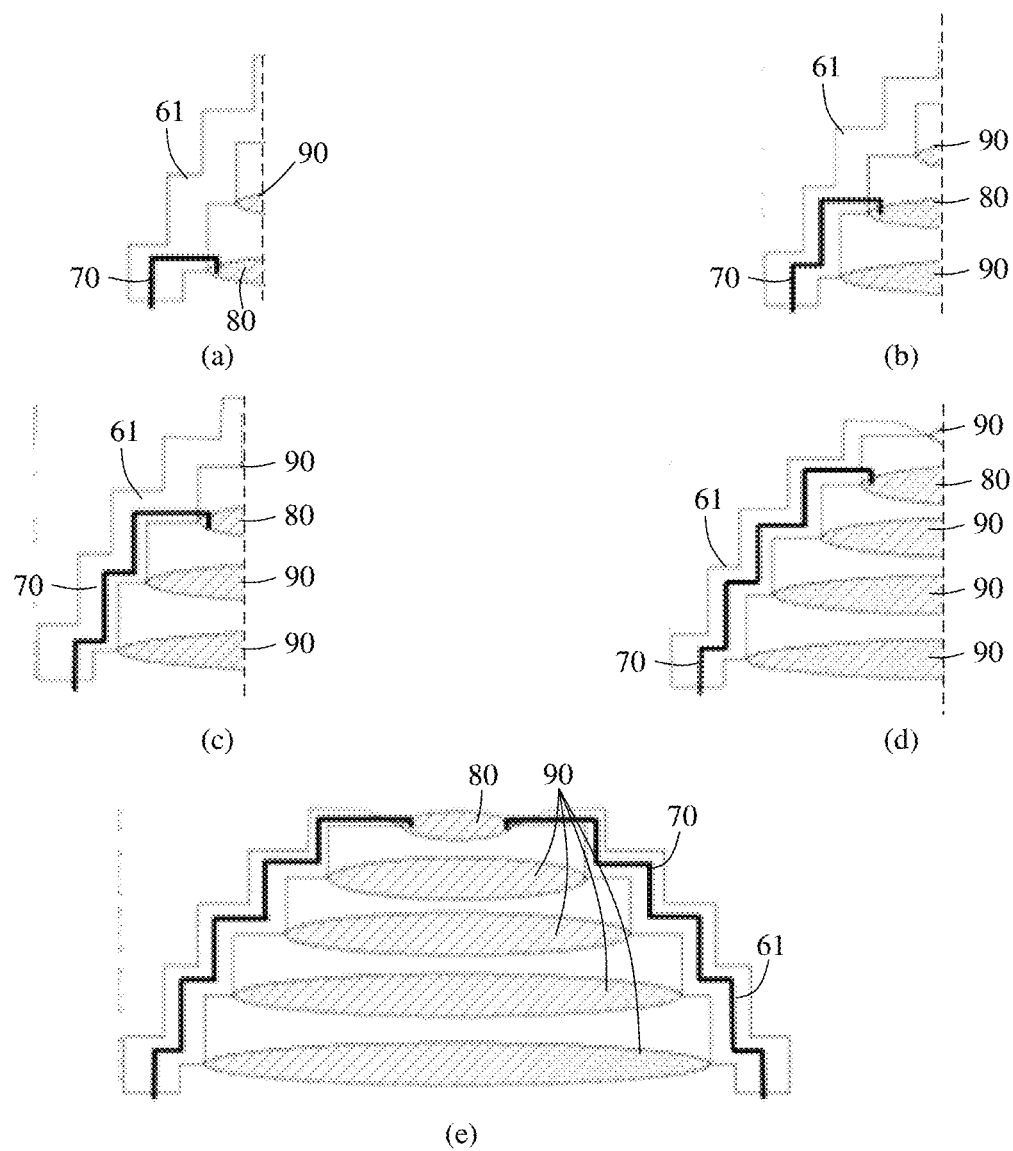
FIG. 13 is a schematic diagram of a connecting circuit in the barrel wall of a lower lens barrel according to some other embodiments of this application.

In other embodiments, as shown in FIG. 13, the connecting circuit 70 electrically connected to the adjustable lens 80 is embedded in the barrel wall of the lower lens barrel 61. The connecting circuit 70 is formed by insert molding. Body forming of the lower lens barrel 61 and assembly of the connecting circuit 70 and the lower lens barrel 61 are completed synchronously, which facilitates production and improves production efficiency. In addition, because the connecting circuit 70 is embedded in the barrel wall of the lower lens barrel 61, the connecting circuit 70 is protected by the barrel wall of the lower lens barrel 61, and is not affected by static electricity in the air. Therefore, failures in the driver circuit 20 and adjustable lens 80 can be avoided, thereby improving the reliability and stability of the camera module. In this way, only two energized circuits are needed to be electrically connected to the positive and negative electrodes of the adjustable lens, respectively, with no need to prepare an additional element for preventing electrostatic breakdown.

As shown in FIG. 13, the lower lens barrel 61 further accommodates a non-adjustable lens 90 (also called a conventional lens, or a non-adjustable focus lens) inside. The non-adjustable lens 90 and the adjustable lens 80 work together to implement convergence or divergence of light.

The non-adjustable lens 90 may be provided by one or plurality. Upper and lower positions of the non-adjustable lens 90 and the adjustable lens 80 are not limited. For example, the non-adjustable lens 90 is provided by one, and the adjustable lens 80 is located above or below the non-adjustable lens 90. Alternatively, as shown in (a) of FIG. 13, the non-adjustable lens 90 is provided by plurality, and the adjustable lens 80 may be a lens closest to the image sensor; or as shown in (b), (c), and (d) of FIG. 13, the non-adjustable lens 90 is provided by plurality, and the adjustable lens 80 is located between two non-adjustable lenses 90; or, as shown in (e) of FIG. 13, the non-adjustable lens 90 is provided by plurality, and the adjustable lens 80 is a lens farthest from the image sensor.

It should be noted that, when the connecting circuit is located on the external surface of the lower lens barrel, the camera module may further include a non-adjustable lens, and similarly the non-adjustable lens is accommodated in the lower lens barrel. The non-adjustable lens may be provided by one or plurality. Upper and lower positions of the non-adjustable lens and the adjustable lens are not limited.

In conclusion, in the camera module of this embodiment of this application, the adjustable lens is disposed inside between the upper lens barrel and the lower lens barrel to perform focusing. In comparison with the existing camera modules that use a voice coil motor, an adjustable lens arranged outside of the lens group, a dual-lens module, or the like, to adjust focusing, an overall height of the module is low and the volume ratio thereof is small, which reduces assembly and fitting difficulties and is beneficial to satisfy requirements of miniaturization of the module and light weight of the device. In addition, compared with the structure of the voice coil motor, the use of the camera module can avoid the problem that a voice coil motor is at high risk of failures when exposed to strong magnetic interference. Moreover, the adjustable lens in this embodiment of this application is a power-zoom lens and does not require a mechanical structure for driving in the focusing process. Therefore, the focusing speed is fast while the power consumption is low.

In some embodiments, the connecting circuit of the adjustable lens is formed directly on the external surface of the lower lens barrel by LDS, and is distributed in straight lines, so that the connecting circuit of the adjustable lens has no curved and complicated arrangement, which ensures that the laser direct structuring LDS process can be performed simply and efficiently and that a working voltage of the connecting circuit is stable, thereby producing metal conductive tracks quickly and automatically, so as to improve overall production efficiency. In addition, because the connecting circuit of the adjustable lens is distributed in straight lines, and compared with the arrangement of winding wires, the phenomenon of disorderly wires can be avoided, and thus the wire layout is more reasonable and efficient. Further, in a case that the connecting circuit of the adjustable lens is directly formed on the external surface of the lower lens barrel by LDS, the camera module may further include an anti-electrostatic assembly, where the anti-electrostatic assembly may include any one or a combination of more than two of a grounding wire, a grounding capacitor, and insulation glue to prevent electrostatic breakdown of the driver circuit and the adjustable lens. In addition, the grounding wire may be directly formed on the external surface of the lower lens barrel by LDS, and the grounding wire is distributed in straight lines, so as to produce metal conductive tracks quickly and automatically, thereby improving the overall production efficiency, avoiding disorderly wires, making the wire layout more reasonable and efficient.

In other embodiments, the connecting circuit of the adjustable lens is embedded in the barrel wall of the lower lens barrel. The connecting circuit is formed by insert molding. Body forming of the lower lens barrel and assembly of the connecting circuit and the lower lens barrel are completed synchronously, which facilitates production and improves production efficiency. In addition, because the connecting circuit is embedded in the barrel wall of the lower lens barrel, the connecting circuit is protected by the barrel wall of the lower lens barrel, and is not affected by static electricity in the air. Therefore, failures in the driver circuit and adjustable lens can be avoided, thereby improving the reliability and stability of the camera module. In this way, only two energized circuits are needed to be electrically connected to the positive and negative electrodes of the adjustable lens, respectively, with no need to prepare an additional element for preventing electrostatic breakdown.

The foregoing embodiments are merely intended to describe the technical solutions of this application, but not intended to constitute any limitation. Although this application is described in detail with reference to the foregoing preferred embodiments, persons of ordinary skill in the art should understand that modifications or equivalent replacements can be made to the technical solutions of this application, without departing from the spirit and scope of the technical solutions of this application.

What is claimed is:

1. A camera module, comprising:
a circuit board;
an image sensor and a driver circuit that are located on the circuit board;
an upper lens barrel and a lower lens barrel that are located on a side of the image sensor that faces away from the circuit board;
a connecting circuit, located on the lower lens barrel; and
an adjustable lens, disposed between the upper lens barrel and the lower lens barrel, wherein the adjustable lens is electrically connected to the driver circuit through the connecting circuit, so as to deform under driving of the driver circuit to adjust a focal power of the camera module; and
wherein the connecting circuit comprises a first conductive track and a second conductive track that are spaced and insulated from each other, two opposite ends of the first conductive track are electrically connected to the driver circuit and a positive electrode of the adjustable lens, respectively, and two opposite ends of the second conductive track are electrically connected to the driver circuit and a negative electrode of the adjustable lens, respectively.

2. The camera module according to claim 1, wherein the connecting circuit is on an external surface of the lower lens barrel.

3. The camera module according to claim 1, wherein projections of the first conductive track and the second conductive track on the circuit board are each a straight line segment.

4. The camera module according to claim 1, wherein the camera module further comprises an anti-electrostatic assembly, the anti-electrostatic assembly comprises a grounding element, and the grounding element is electrically connected to the adjustable lens.

5. The camera module according to claim 4, wherein the grounding element comprises a grounding wire, the grounding wire is on an external surface of the lower lens barrel, and the grounding wire is electrically connected to the adjustable lens and the driver circuit.

6. The camera module according to claim 5, wherein a projection of the grounding wire on the circuit board is a straight line segment.

7. The camera module according to claim 4, wherein the grounding element comprises a capacitor, a first terminal of the capacitor is grounded, and a second terminal of the capacitor is electrically connected to the adjustable lens and the driver circuit.

8. The camera module according to claim 4, wherein the anti-electrostatic assembly comprises insulation glue, and the insulation glue covers the connecting circuit.

9. The camera module according to claim 1, wherein the camera module further comprises a base molded on the circuit board, the base wraps the driver circuit, the base comprises an optical aperture configured for light to travel through to the image sensor, and the lower lens barrel is mounted on the base.

10. The camera module according to claim 9, wherein the base comprises a first recess and a second recess, wherein a conductive material is in both of the first recess and the second recess, the first conductive track has one end in direct contact with the conductive material in the first recess and is electrically connected to the driver circuit through the conductive material in the first recess, and the second conductive track has one end in direct contact with the conductive material in the second recess and is electrically connected to the driver circuit through the conductive material in the second recess.

11. The camera module according to claim 9, further comprising a grounding element, wherein when the grounding element comprises a grounding wire, the base comprises a third recess, wherein a conductive material is in the third recess, and the grounding wire has one end in direct contact with the conductive material in the third recess and is electrically connected to the circuit board through the conductive material in the third recess.

12. The camera module according to claim 9, wherein the camera module further comprises a filter, and the filter is mounted on a side of the base that faces away from the circuit board and is located between the adjustable lens and the image sensor.

13. The camera module according to claim 1, wherein the adjustable lens comprises a transparent supporting layer, a transparent deformable layer, and a piezoelectric layer that are stacked in sequence, wherein the piezoelectric layer is configured to deform the deformable layer after being energized, so as to change a radius of curvature of a curved optical surface of the adjustable lens.

14. The camera module according to claim 1, wherein the camera module further comprises a non-adjustable lens, the non-adjustable lens is disposed inside between the upper lens barrel and the lower lens barrel, and the non-adjustable lens is located on a side of the adjustable lens that faces the circuit board, or the non-adjustable lens is located on a side of the adjustable lens that faces away from the circuit board.

15. An electronic apparatus, comprising a camera module, wherein the camera module comprises:
a circuit board;
an image sensor and a driver circuit that are located on the circuit board;
an upper lens barrel and a lower lens barrel that are located on a side of the image sensor that faces away from the circuit board;
a connecting circuit, located on the lower lens barrel; and
an adjustable lens, disposed between the upper lens barrel and the lower lens barrel, wherein the adjustable lens is electrically connected to the driver circuit through the connecting circuit, so as to deform under driving of the driver circuit to adjust a focal power of the camera module; and
wherein the connecting circuit comprises a first conductive track and a second conductive track that are spaced and insulated from each other, two opposite ends of the first conductive track are electrically connected to the driver circuit and a positive electrode of the adjustable lens, respectively, and two opposite ends of the second conductive track are electrically connected to the driver circuit and a negative electrode of the adjustable lens, respectively.

16. The electronic apparatus according to claim 15, wherein the connecting circuit is on an external surface of the lower lens barrel.

17. The electronic apparatus according to claim 15, wherein projections of the first conductive track and the second conductive track on the circuit board are each a straight line segment.

18. The electronic apparatus according to claim 15, wherein the camera module further comprises an anti-electrostatic assembly, the anti-electrostatic assembly comprises a grounding element, and the grounding element is electrically connected to the adjustable lens.

19. The electronic apparatus according to claim 18, wherein the grounding element comprises a grounding wire, the grounding wire is formed on an external surface of the lower lens barrel, and the grounding wire is electrically connected to the adjustable lens and the driver circuit.

20. The electronic apparatus according to claim 19, wherein a projection of the grounding wire on the circuit board is a straight line segment.

* * * * *